(12) United States Patent
Han et al.

(10) Patent No.: US 9,766,490 B2
(45) Date of Patent: Sep. 19, 2017

(54) TOUCH WINDOW AND LCD USING THE SAME

(75) Inventors: Jae Heung Han, Seoul (KR); Jang Whan Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 138 days.

(21) Appl. No.: 14/235,629

(22) PCT Filed: Nov. 2, 2011

(86) PCT No.: PCT/KR2011/008300
§ 371 (c)(1),
(2), (4) Date: Jan. 28, 2014

(87) PCT Pub. No.: WO2013/015490
PCT Pub. Date: Jan. 31, 2013

(65) Prior Publication Data
US 2014/0168545 A1   Jun. 19, 2014

(30) Foreign Application Priority Data
Jul. 28, 2011   (KR) .......................... 10-2011-0075190

(51) Int. Cl.
G02F 1/1333   (2006.01)
G06F 3/047   (2006.01)

(52) U.S. Cl.
CPC .......... *G02F 1/13338* (2013.01); *G06F 3/047* (2013.01); *G02F 2001/133331* (2013.01)

(58) Field of Classification Search
CPC ..... G02F 1/13338; G02F 2001/133331; G06F 3/047; G06F 3/044

(Continued)

(56) References Cited

U.S. PATENT DOCUMENTS 4,882,565 A * 11/1989 Gallmeyer ............. B60Q 3/001
340/461
6,181,344 B1 * 1/2001 Tarpenning ........... G06F 1/1626
715/825

(Continued)

FOREIGN PATENT DOCUMENTS

CN   101419521 A   4/2009
CN   10-1501618 A   8/2009

(Continued)

OTHER PUBLICATIONS

International Search Report in International Application No. PCT/KR2011/008300, filed Nov. 2, 2011.

(Continued)

*Primary Examiner* — Sang V Nguyen
(74) *Attorney, Agent, or Firm* — Saliwanchik, Lloyd & Eisenschenk

(57) ABSTRACT

Provided is a structure capable of improving a freedom of a design and manufacturing process efficiency of an icon area of a touch window. To this end, a touch window is configured to include a sensing unit that is disposed on a transparent window and senses a contact through sensing electrode patterns, wiring parts electrically connected with the sensing electrode patterns, and a metal pattern part for a function connected with ends of the wiring parts. As set forth above, in forming the icon area of the touch window, the exemplary embodiment of the present can improve the freedom of a design while improving the manufacturing process efficiency by patterning the metal pattern part that is the signal input unit of functions formed on the surface of the transparent window at the time of implementing the sensing electrode pattern, in forming the icon area of the touch window.

14 Claims, 8 Drawing Sheets

(58) Field of Classification Search
USPC .......................................................... 349/12
See application file for complete search history.

(56) References Cited

U.S. PATENT DOCUMENTS

| | | | | |
|---|---|---|---|---|
| 7,379,139 B2* | 5/2008 | Yamazaki | ............. | G02F 1/1362 |
| | | | | 345/104 |
| 7,540,620 B2* | 6/2009 | Weller | ...................... | B60R 1/12 |
| | | | | 359/879 |
| 7,808,608 B2* | 10/2010 | Park | ...................... | G02F 1/1333 |
| | | | | 349/110 |
| 8,224,391 B2* | 7/2012 | Kim | .................. | G02F 1/133603 |
| | | | | 345/107 |
| 2005/0253976 A1* | 11/2005 | Sekiguchi | ............. | G02F 1/1362 |
| | | | | 349/40 |
| 2008/0143683 A1* | 6/2008 | Hotelling | ............... | G06F 3/0416 |
| | | | | 345/173 |
| 2009/0207151 A1* | 8/2009 | Liu | ......................... | G06F 3/044 |
| | | | | 345/174 |
| 2010/0026656 A1* | 2/2010 | Hotelling | ................ | G06F 3/044 |
| | | | | 345/174 |
| 2010/0026662 A1* | 2/2010 | Oohira | ................ | G02F 1/13338 |
| | | | | 345/174 |
| 2010/0182259 A1 | 7/2010 | Jung et al. | | |
| 2010/0182267 A1* | 7/2010 | Lee | ......................... | G06F 3/044 |
| | | | | 345/173 |
| 2010/0321326 A1* | 12/2010 | Grunthaner | ............. | G06F 3/044 |
| | | | | 345/174 |
| 2011/0050636 A1* | 3/2011 | Nagata | .................... | G06F 3/044 |
| | | | | 345/174 |
| 2011/0141037 A1 | 6/2011 | Hwang et al. | | |
| 2011/0210935 A1* | 9/2011 | Chuang | ................. | G06F 3/0412 |
| | | | | 345/174 |
| 2011/0242058 A1* | 10/2011 | Lee | .......................... | G06F 3/041 |
| | | | | 345/176 |
| 2011/0242465 A1* | 10/2011 | Lee | .................... | G02F 1/133308 |
| | | | | 349/110 |
| 2012/0327021 A1* | 12/2012 | Ryu | ......................... | G06F 3/044 |
| | | | | 345/174 |

FOREIGN PATENT DOCUMENTS

| | | |
|---|---|---|
| CN | 101782821 A | 7/2010 |
| CN | 102096496 A | 6/2011 |
| JP | 2011-071949 A | 4/2011 |
| KR | 10-1002308 B1 | 12/2010 |
| KR | 10-2011-0020053 A | 3/2011 |
| KR | 10-1048931 B1 | 7/2011 |
| KR | 10-1048974 B1 | 7/2011 |
| KR | 20-2010-0004485 U | 12/2011 |
| WO | WO-2009/023440 A1 | 2/2009 |

OTHER PUBLICATIONS

European Search Report dated Nov. 19, 2014 in European Application No. 11869874.5.
Office Action dated Apr. 17, 2014 in Taiwanese Application No. 100140866.
Office Action dated Jan. 4, 2016 in Chinese Application No. 201180073847.7.

* cited by examiner

PRIOR ART

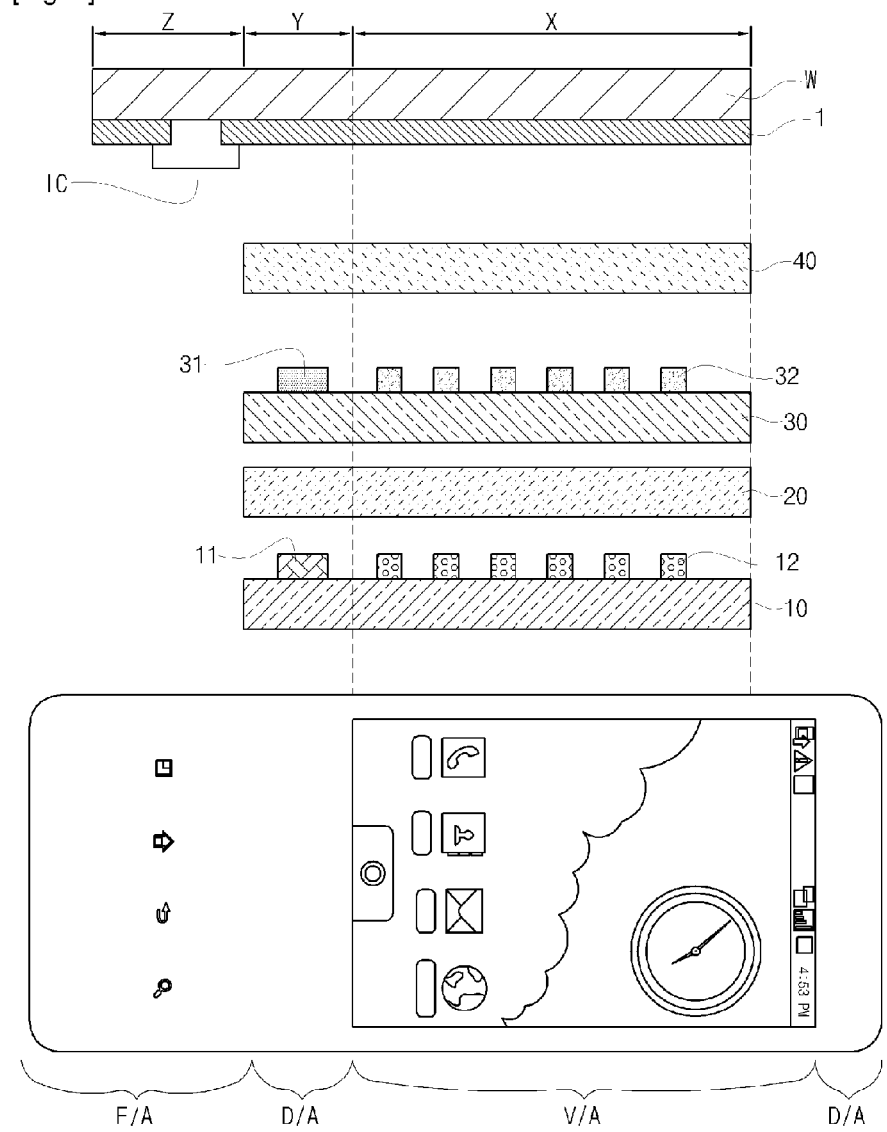

[Fig. 4]
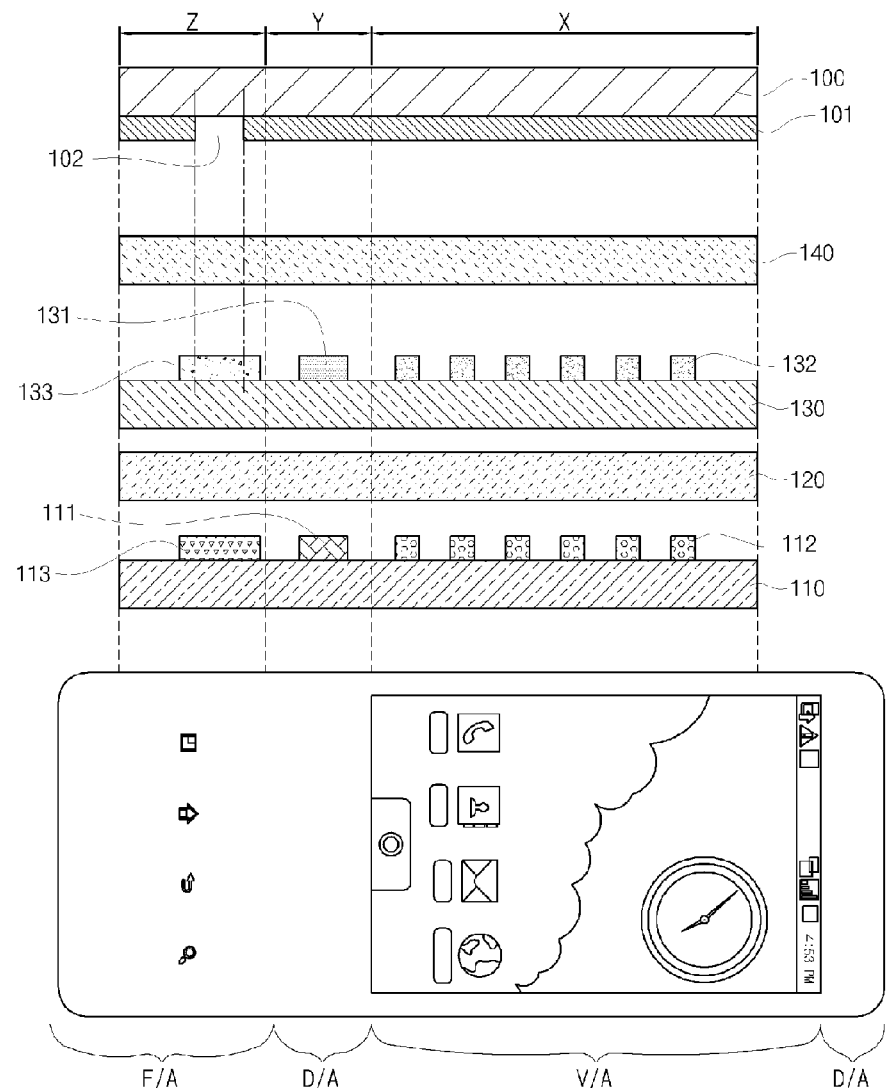

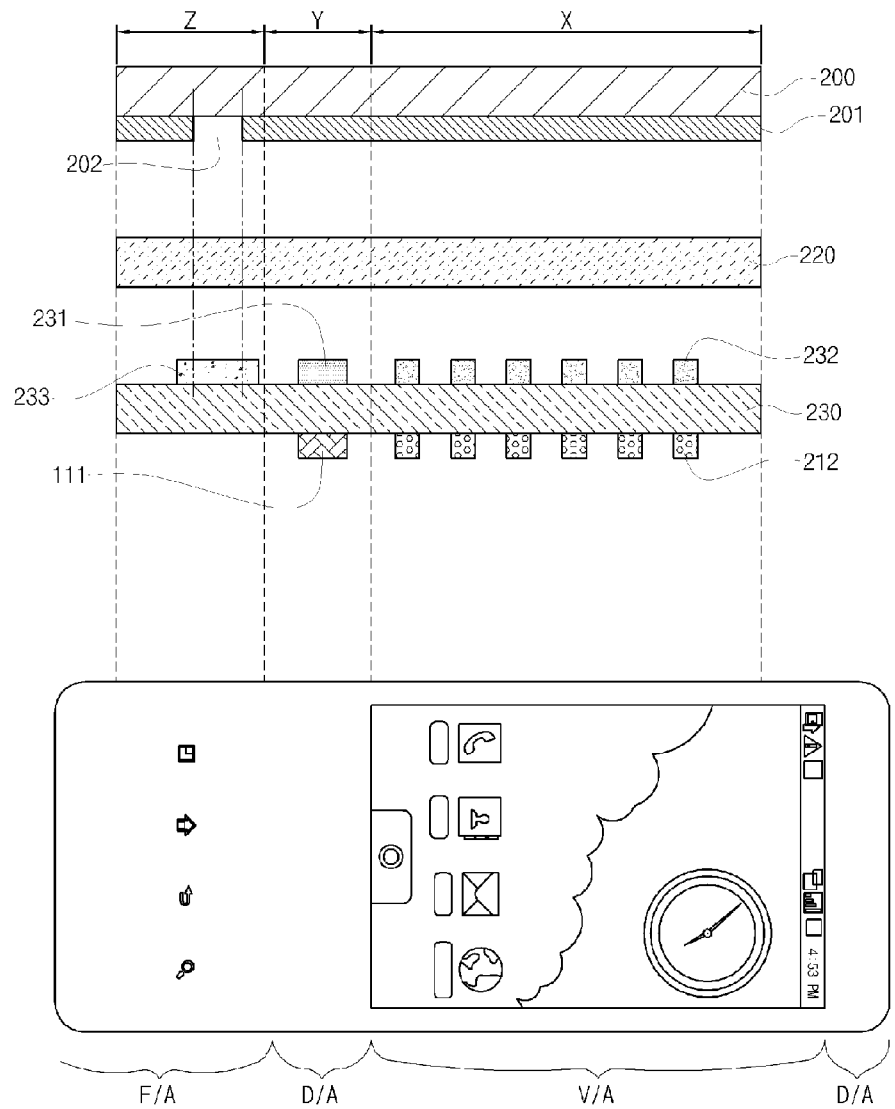
[Fig. 5]

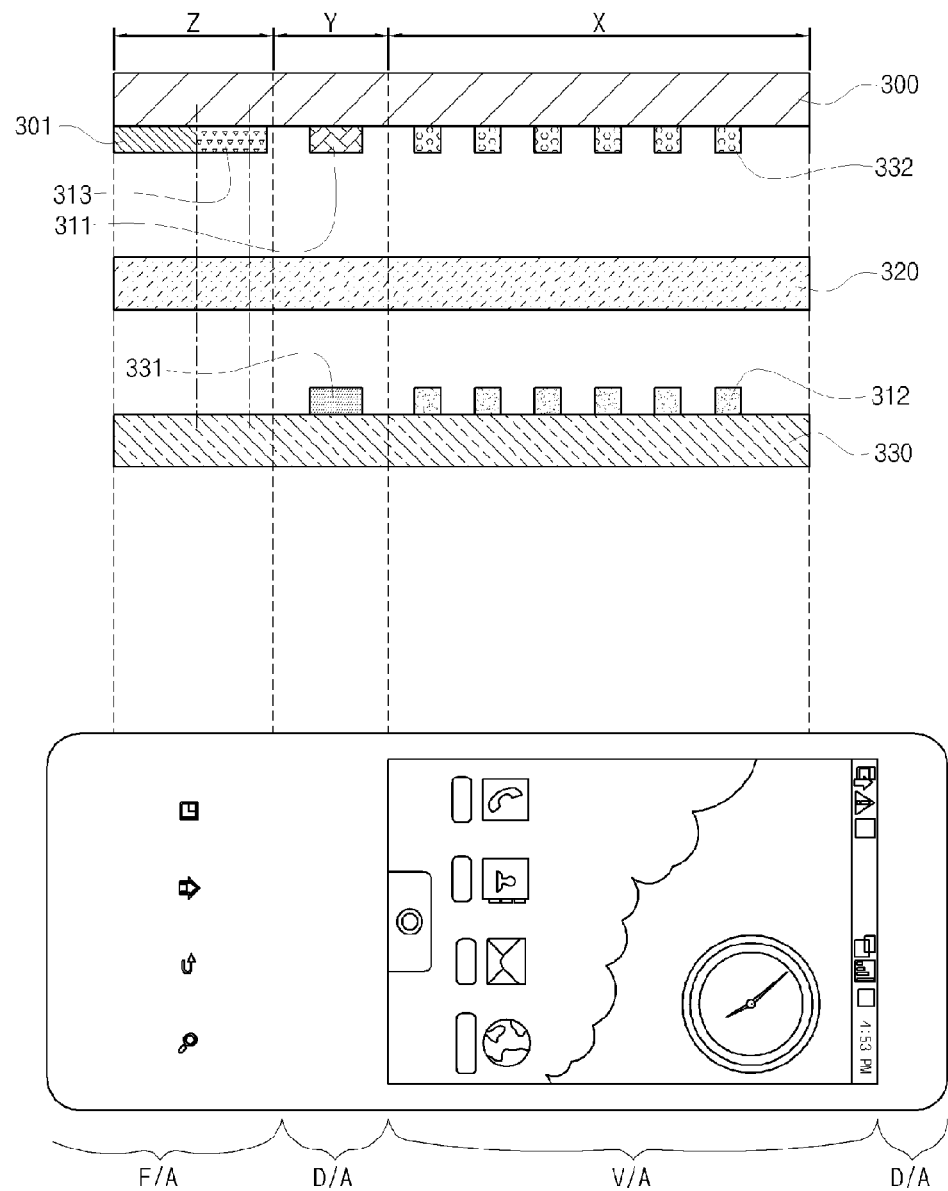
[Fig. 6]

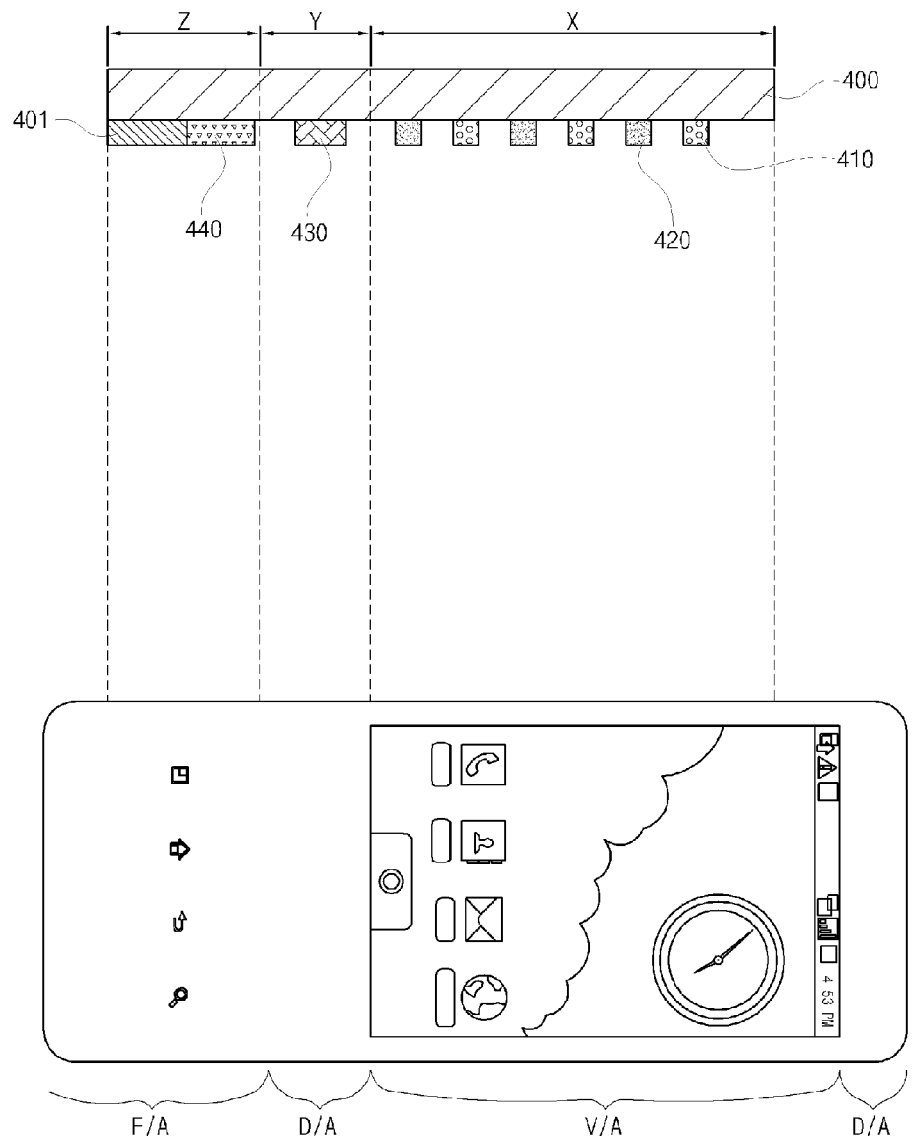

[Fig. 8]
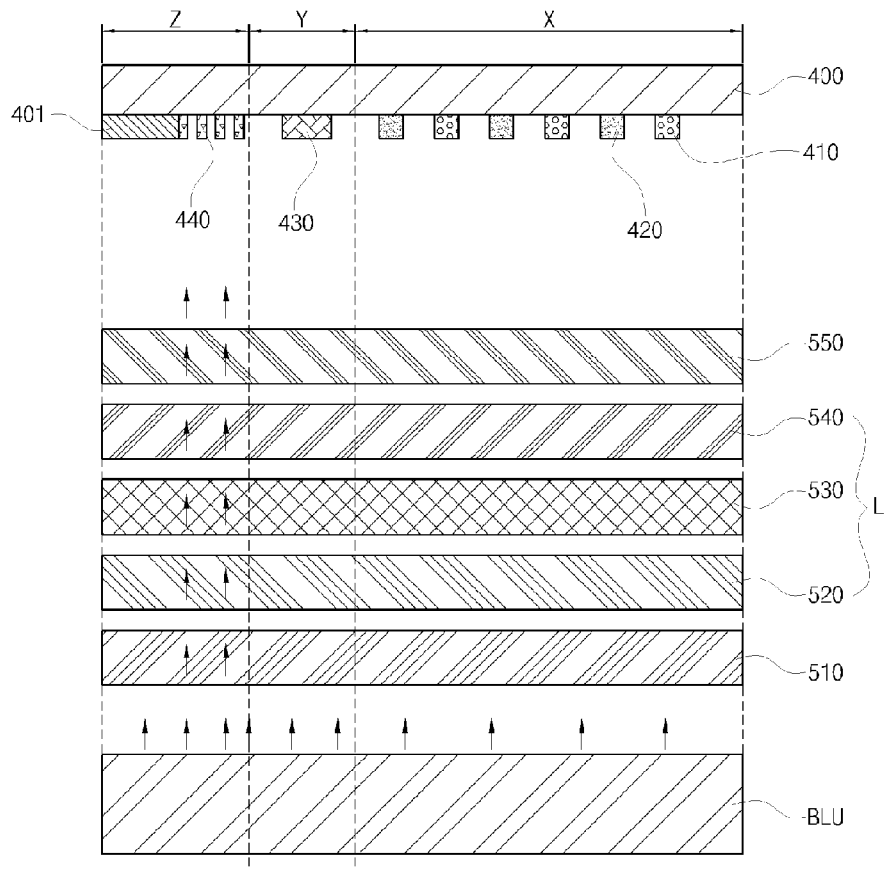
[Fig. 9]
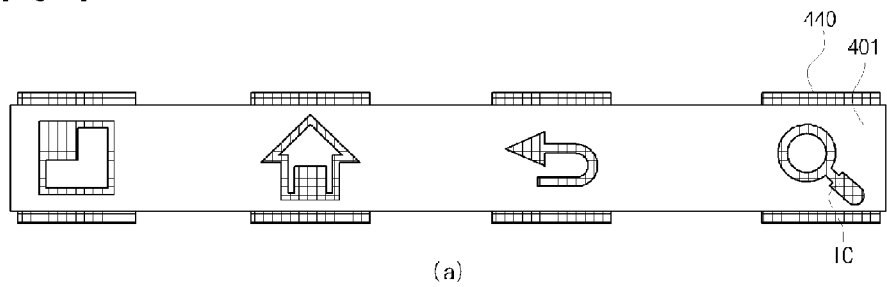
(a)
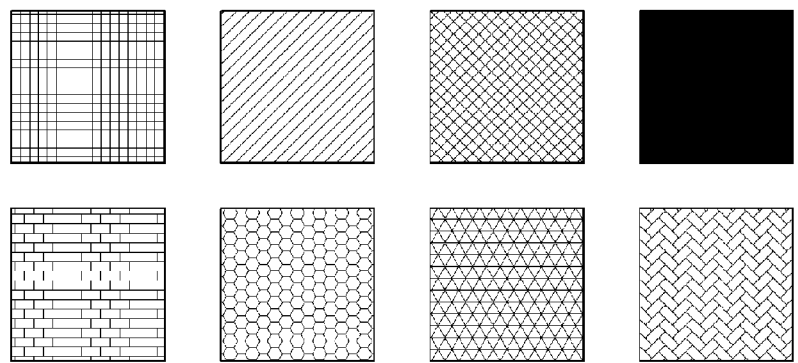
(b)

TOUCH WINDOW AND LCD USING THE SAME

CROSS-REFERENCE TO RELATED APPLICATIONS

This application is the U.S. national stage application of International Patent Application No. PCT/KR2011/008300, filed Nov. 2, 2011, which claims priority to Korean Application No. 10-2011-0075190, filed Jul. 28, 2011, the disclosures of each of which are incorporated herein by reference in their entirety.

TECHNICAL FIELD

The present invention relates to a structure capable of improving a freedom of a design and manufacturing process efficiency of an icon area of a touch window.

BACKGROUND ART

FIG. 1 is a plan view of a touch window and FIG. 2 is a cross-sectional view taken along line I-I' of FIG. 1.

As shown in FIG. 1, the touch window referred to as a touch screen panel is configured to include a transparent window W receiving a contact through touch from the outside, a touch sensor module (TSP) for being disposed under the transparent window W and implements a view area (V/A) and a dead area (D/A) through a sensing electrode pattern layer, and a function (F) for being electrically connected to the touch sensor module (TSP), formed on a surface of the transparent window and is implemented by icons.

FIG. 3 is a side cross-sectional view showing in detail the structure of the touch sensor module (TSP) in a structure of FIG. 2.

That is, in the touch window according to the related art, a printed pattern 1 is disposed under the transparent window W and substrates 10 and 30 on which sensing electrode patterns 12 and 32 below the printed pattern 1 are patterned are adhered via adhesive materials 20 and 40 such as OCA, or the like. The transparent window area corresponding to an area in which the sensing electrode patterns 12 and 32 are formed becomes a valid portion X as the view area (V/A), the portion corresponding to the dead area (D/A) becomes a wiring part Y in which a wiring pattern 31 is implemented, and a function area (F/A) in which icons are formed is implemented by a structure in which icons (ICs) are printed.

In the structure, in the function area (F/A) that is an area in which the above-mentioned icons are implemented, the icons are printed under the transparent window 10 and the icons are applied with a blinking function so as to feedback whether a user is touched at the time of a touch of a user using a light source such as an LED, or the like. In this case, the printing of the icons has been performed by mainly using transflective printing, paste, or liquid-phase resin.

However, when forming the icon part by a typical printing method, the printing has been performed by applying only a single color (for example, cool grays), despite an emphasis of a design in implementing products. The methods cause uniformity of a design factor and create products having a similar image, such that it may be difficult to differentiate products. In addition, the transflective design is also needed in a manufacturing process and thus, a separate printing process is needed, such that the manufacturing process may be long.

DISCLOSURE OF INVENTION

Technical Problem

An aspect of the present invention is directed to provide a touch window capable of improving a freedom of a design while improving manufacturing process efficiency by patterning metal pattern parts that are signal input units for functions formed on a surface of a transparent window at the time of implementing sensing electrode patterns, in forming an icon area of the touch window.

Solution to Problem

According to an embodiment of the present invention, a touch window includes a transparent window; a sensing unit for being disposed on the transparent window and senses a contact through sensing electrode patterns; wiring parts for being electrically connected to the sensing electrode patterns; and metal pattern parts for functions for being connected with ends of the wiring parts.

In particular, when implementing the sensing electrode pattern or the wiring pattern, the above-mentioned metal pattern part can increase process efficiency so as to be simultaneously or sequentially be implemented on the same plane and implement the reflective effect without performing a separate printing process by applying the same material as the sensing electrode pattern or the wiring pattern. In particular, the light transmitting effect can also be implemented by implementing the light transmitting pattern on the metal wiring pattern.

Further, the structure of the above-mentioned touch window may be variously changed such as a structure directly formed on the transparent window or a structure implemented on an independent transparent substrate, or the like, according to the implementation of the sensing electrode pattern.

The above-mentioned touch window according to the exemplary embodiment of the present invention may be configured to include a backlight unit emitting light and a liquid crystal module including a color filter and a thin film transistor receiving light emitted from the backlight unit and a liquid crystal display.

Advantageous Effects of Invention

As set forth above, in forming the icon area of the touch window, the exemplary embodiments of the present can improve the freedom of a design while improving the manufacturing process efficiency by patterning the metal pattern parts that are the signal input units of functions formed on the surface of the transparent window at the time of implementing the sensing electrode patterns, in forming the icon area of the touch window.

In particular, the exemplary embodiments of the present invention can control transmittance by adding the fine light transmitting pattern or the reflective pattern to the metal pattern part performing the signal input, thereby controlling the brightness and forming perspective of various icons.

BRIEF DESCRIPTION OF DRAWINGS

The above and other aspects, features and advantages of certain exemplary embodiments of the present invention will be more apparent from the following description taken in conjunction with the accompanying drawings, in which:

FIG. 3 is a side cross-sectional view showing in detail a structure of a touch sensor module (TSP) in a structure of FIG. 2;

FIG. 4 is a cross-sectional view showing a structure of a touch window according to an exemplary embodiment of the present invention;

FIG. 5 is a diagram showing another exemplary of a touch window according to the present invention shown in FIG. 4;

FIGS. 6 to 8 are diagrams showing another exemplary embodiment of the present invention; and FIG. 9 is a diagram showing a modified example of metal pattern parts.

Figure 1:
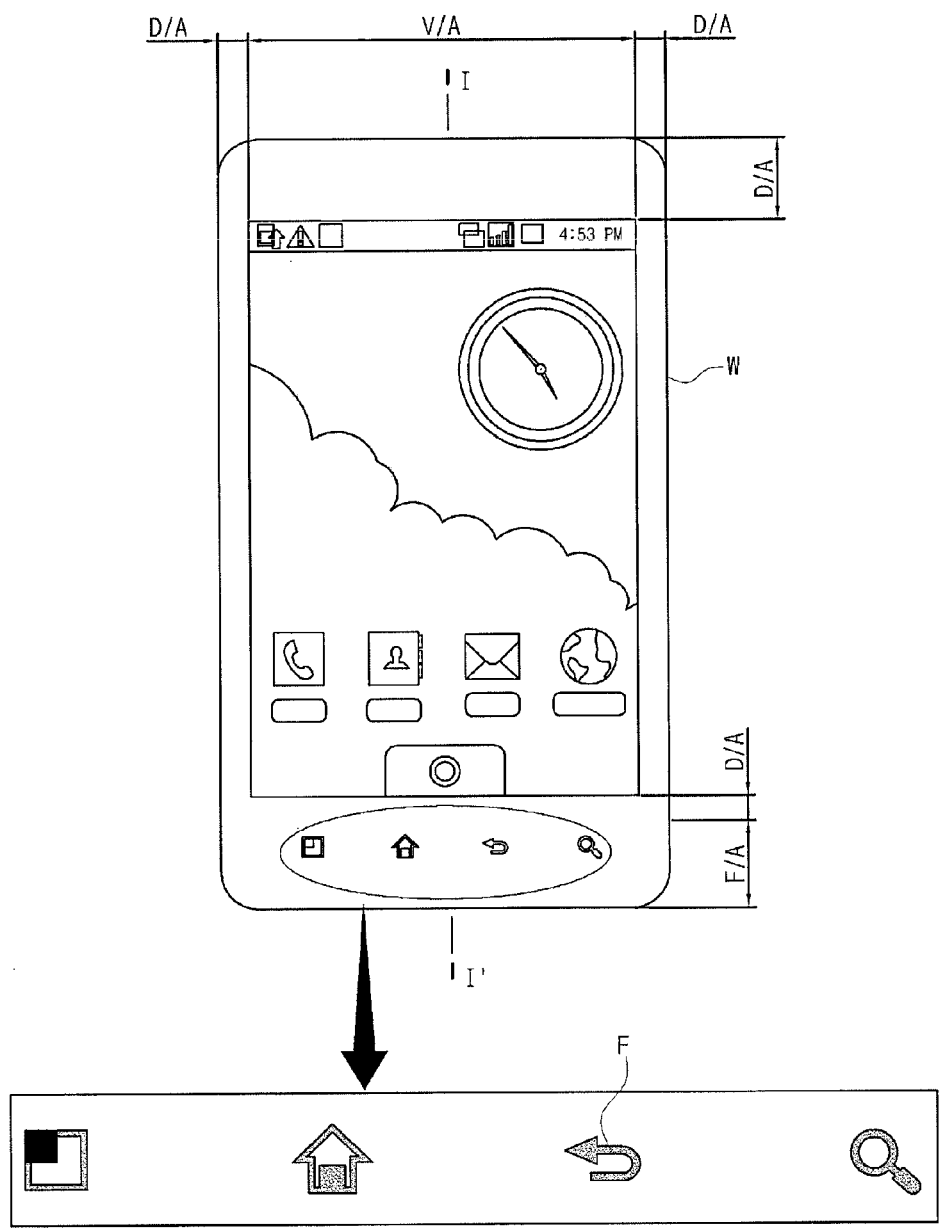
FIG. 1 is a plan view of a touch window.
Figure 2:
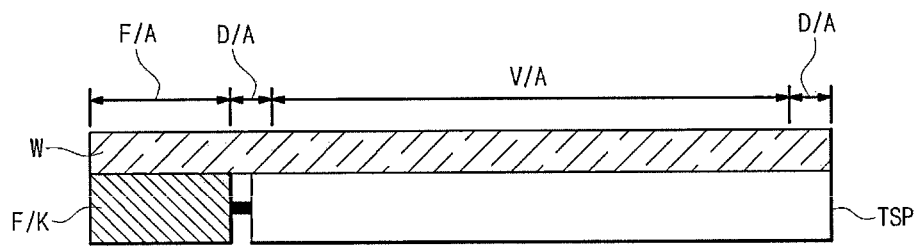
FIG. 2 is a cross-sectional view of line I-I' of FIG. 1.

REFERENCE NUMERALS 100, 200, 300, 400: Transparent Window
111, 131: Wiring Pattern
112, 132, 212, 232, 312, 332, 410, 420: Sensing electrode pattern
113, 133, 233, 313, 440: Metal pattern part
120, 140, 220, 320: Adhesive insulating layer
V/A: View Area
D/A: Dead Area
F/A: Function Area

BEST MODE FOR CARRYING OUT THE INVENTION

Exemplary embodiments of the present invention will be described below in detail with reference to the accompanying drawings. Wherever possible, the same reference numerals will be used to refer to the same elements throughout the specification, and a duplicated description thereof will be omitted. It will be understood that although the terms "first", "second", etc. are used herein to describe various elements, these elements should not be limited by these terms. These terms are only used to distinguish one element from another element.

MODE FOR THE INVENTION

1. First Exemplary Embodiment

FIG. 4 is a cross-sectional view showing a structure of a touch window according to an exemplary embodiment of the present invention.

Hereinafter, an area of a transparent window corresponding to an area in which sensing electrode patterns are formed is defined as a valid part X of a view area (V/A), a portion corresponding to a dead area (D/A) that is defined by a wiring part Y in which the wiring patterns are implemented, and an area in which an icon (IC) is formed in a function (F/A) in which icons are formed is defined as an icon part Z.

Referring to the shown drawings, the touch window according to the exemplary embodiment of the present invention may be configured to include a transparent window 100, a sensing unit that is disposed on the transparent window 100 and senses a contact through sensing electrode patterns 112 and 132, wiring patterns 111 and 131 that are electrically connected to the sensing electrode patterns, and metal pattern parts 113 and 133 for functions that are connected to ends of the wiring parts.

That is, in the structure shown in FIG. 4, the sensing unit that is formed on a bottom surface of the transparent window 100 has a structure in which the sensing electrode patterns 112 and 132 are each patterned on one surface of separate transparent substrates 110 and 130. In this case, the wiring patterns 111 and 131 are connected to the sensing electrode patterns 112 and 132 on the same transparent substrate and the metal pattern parts 113 and 133 connected to the ends of the wiring patterns 111 and 131 may be formed thereon.

In this case, the sensing unit may be configured to include a first sensing electrode pattern 132 formed on the transparent substrate 130 and the second sensing electrode pattern 112 formed on another transparent substrate 110. The transparent substrate may use a film material or glass. In this case, the film material may use a film made of any one of polyethylene terephthalate (PET), polycarbonate (PC), polyether sulfone (PES), polyimide (PI), and polymethyl methaacrylate (PMMA).

That is, the patterning of the metal pattern parts 113 and 133 may be formed by simultaneously or sequentially the metal pattern parts during the process of patterning the sensing electrode pattern. For example, the metal pattern parts 113 and 133 may be implemented at a position corresponding to the function area Z having the above-mentioned structure while photolithography is applied to the film material coated with the transparent electrode material, such as indium-tin oxide (ITO), indium zinc oxide (IZO), zinc oxide (ZnO), or the like, all of which are used as the sensing electrode, to implement the sensing electrode pattern. The processed metal patterns 113 and 133 are electrically connected to the wiring pattern 111 and 131. Due to the process, when light may be transmitted by forming the icon 102 having an opened structure on the function area Z of the printed pattern 101 formed on the bottom surface of the transparent window 100 by the printing, various icons are implemented according to the colors of the lower metal pattern parts 111 and 131 and the function area implementing the function corresponding to the icon may be implemented without performing the separate printing process.

In particular, when forming the transparent pattern on the metal pattern parts to be described later, it is possible to implement various changes in a design, such as a control of a color, a control of a perspective, or the like.

In addition, the transparent window 100 and the transparent substrates 110 and 130 are bonded to each other via the adhesive material layers 120 and 140.

In the above-mentioned first exemplary embodiment, the wiring pattern and the sensing electrode patterns may use the same material. Further, the wiring pattern, the sensing electrode patterns, and the metal pattern may be implemented by the same material. That is, in implementing the sensing electrode pattern, the wiring pattern, and the metal pattern, a process of simultaneously forming the wiring pattern, the sensing electrode pattern, or the metal pattern part using a conductive material such as Ag, Al, Cu, or the like, rather than using the above-mentioned transparent electrode material may be used. This may solve the problem in that the pattern shape at the time of forming the electrode pattern using the ITO material is shown, the manufacturing cost is increased due to the ITO material that is an expensive material, and it is difficult to manufacture a structure having the ITO material layer on both surfaces of the single base substrate due to the degradation in film hardness of the ITO material and provide a process of implementing the freedom of various designs regardless of the degradation in the film hardness while lowering the manufacturing cost through the process of simultaneously forming each pattern of the valid part X, the wiring part Y, and the icon part Z by forming and patterning the conductive material on the optical substrate, instead of the ITO material.

2. Second Exemplary Embodiment

FIG. 5 is a diagram showing another exemplary of a touch window according to the present invention shown in FIG. 4. the disposition structure of the valid part X, the wiring part Y, and the icon part Z, printing the printed pattern under the transparent window 200, and patterning the icon 202 in an opened type that are shown in FIG. 5 are the same as FIG. 4. However, FIG. 5 is different from FIG. 4 in that in forming the sensing unit formed under the transparent window 200, a first sensing electrode pattern 232 and a second sensing electrode pattern 212 are implemented on both surfaces of a single transparent substrate 230.

Further, the wiring part and the metal pattern part 233 corresponding to the icon are formed on the same plane as the first sensing electrode pattern 232 on one surface of the transparent substrate 230. Further, in the shown structure, the metal pattern part 233 may be formed on the same plane as the second sensing electrode pattern 212.

3. Third Exemplary Embodiment

FIG. 6 shows another exemplary embodiment different from the first and second exemplary embodiments as described above. The disposition structure of the valid part X, the wiring part Y, and the icon part Z is similar but the difference directly forms a first sensing electrode pattern 332 on one surface of the transparent window 100 and a wiring pattern 311 and a metal pattern 313 are also formed on the same plane as the first sensing electrode pattern 332.

In this configuration, directly forming the first sensing electrode pattern 332 on one surface of the transparent window 100 corresponds to a concept including directly forming on the surface of the transparent substrate without the separate film layer through the deposition, coating, and printing as shown and implementing the patterns by selectively etching the separate film substrate (for example, ITO film, or the like).

Further, the metal pattern 313 may be formed on the same plane on which the second sensing electrode pattern 312 and the wiring pattern 331 of the transparent substrate 330 are formed by simultaneously performing the process of patterning the second sensing electrode pattern 312 formed on one surface of the transparent substrate 330.

4. Third Exemplary Embodiment

Hereinafter, a structure of the touch window according to the exemplary embodiment of the present invention as a fourth exemplary embodiment will be described with reference to FIG. 7.

The difference between the structure of the fourth exemplary embodiment and the structure of the third exemplary embodiment is similar in the disposition structure of the valid part X, the wiring part Y, and the icon part Z but a first sensing electrode pattern 410 and a second sensing electrode pattern 420 are simultaneously formed directly on one surface of the transparent window 400. In addition, the metal pattern part 440 may be formed on the same plane as the first and second sensing electrode patterns 410 and 420.

Further, the first sensing electrode pattern 410 and the second sensing electrode pattern 420 are patterned while being spaced apart from each other so as to be electrically insulated from each other. That is, the first and second sensing electrode patterns are implemented on the same plane. The first sensing electrode layer for determining a first axis (for example, an X axis) component of a contact may be patterned on one surface and the second sensing electrode layer for determining a second axis (for example, a Y axis) component of a contact may be patterned by implementing the disposition in which the second sensing electrode layer is insulated from the first sensing electrode layer.

FIG. 8 shows an exemplary embodiment implementing the light transmitting pattern on the metal pattern part to control the transmittance.

Referring to FIGS. 7 and 8, the metal pattern part 440 is formed in a structure in which a predetermined light transmitting pattern is formed, thereby controlling the light transmittance. That is, the metal pattern part disposed under the icon (IC) of the opened structure formed on the printed pattern 401 of FIG. 8 may be implemented in a mesh structure, a net structure, or a regular or irregular light transmitting pattern as shown in the structure of FIG. 8B. The implementation of the light transmitting pattern forms the fine transmitting holes during the photolithography process by the selective etching in forming the metal pattern part 440 and thus, the light transmitting pattern may be formed in a structure of implementing the transmitting effect and the reflective effect of light.

For example, when the light transmitting pattern is formed to have the structure of including or coating Ag or a material having high reflectivity on the metal pattern part 440, the reflective effect due to the metal particles or the light transmitting effect due to the transmitting hole may be implemented together. As the reflective material, materials such as $TiO_2$, $CaCO_3$, $BaSO_4$, $Al_2O_3$, silicon, PS, Al, or the like, may be used.

Referring to the touch window according to the exemplary embodiment of the present invention having the structure shown in FIG. 8, the touch window according to the exemplary embodiment of the present invention is coupled with a liquid crystal module (L) so as to be applied to various display devices.

For example, as shown in FIG. 8, in a liquid crystal display that is a passive light emitting device using a backlight unit (BLU) as a light emitting module, the touch window having the above-mentioned structure may be coupled the top portion of the liquid crystal display including the liquid crystal module including a thin film transistor 520, a liquid crystal 530, a color filter 540 and a plurality of polarizing films 510 and 550. In this case, the light transmitting pattern of the metal pattern part 440 of the touch window 400 according to the exemplary embodiment of the present invention transmits the path of light (arrow) emitted from the backlight unit transmits so as to implement a light emitting function in various icons.

FIG. 9 shows various implementation examples implementing the light transmitting pattern on the metal pattern part 440 in the structure of FIG. 8.

The icon (IC) function in the printed pattern 401 having the opened structure simultaneously implements the transmitting effect and the reflective effect through the light transmission while implementing the reflection by the metal pattern part and the light transmitting pattern disposed thereunder.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. A touch window, comprising:
   a transparent window;
   a sensing unit disposed on the transparent window and sensing a contact through sensing electrode patterns;
   wiring patterns electrically connected to the sensing electrode patterns;
   a metal pattern part connected with ends of the wiring patterns;
   a printed pattern disposed on the transparent window; and
   an icon disposed between the transparent window and the metal pattern part;
   wherein the metal pattern part includes a light transmitting pattern that controls light transmittance;
   wherein the sensing unit, the wiring patterns, and the metal pattern part each is made of at least one selected from a group consisting of Ag, Al, and Cu;
   wherein the metal pattern part includes or is coated with any one reflective material of $TiO_2$, $CaCO_3$, $BaSO_4$ and Polystyrene (PS);
   wherein the light transmitting pattern comprises a hole transmitting light,
   wherein the metal pattern part comprises metal particles reflecting light, and
   wherein the icon having an opened structure on a function area of the printed pattern is disposed to correspond to two different layers of the metal pattern part.

2. The touch window of claim 1, wherein the sensing unit includes a first sensing electrode pattern and a second sensing electrode pattern that are patterned on a transparent substrate coupled with the transparent window via adhesive material layers.

3. The touch window of claim 2, wherein the metal pattern part is disposed on the same plane as the first sensing electrode pattern or the second sensing electrode pattern.

4. The touch window of claim 3, wherein the sensing unit has a structure in which the first sensing electrode pattern and the second sensing electrode pattern are patterned on one surface of the same transparent substrate so as to be insulated from each other.

5. The touch window of claim 3, wherein the sensing unit has a structure in which the first sensing electrode pattern and the second sensing electrode pattern are each patterned on one surface and the other surface of the same transparent substrate.

6. The touch window of claim 3, wherein the sensing unit has a structure in which the first sensing electrode pattern and the second sensing electrode pattern are each patterned on surfaces of different transparent substrates.

7. The touch window of claim 2, wherein the sensing unit includes:
   a first sensing electrode pattern that is patterned on one surface of the transparent window; and
   a second sensing electrode pattern that is patterned on the transparent substrate coupled with the transparent window via the adhesive material layers.

8. The touch window of claim 7, wherein the metal pattern part is formed on the transparent window.

9. The touch window of claim 1, wherein the sensing unit includes the first sensing electrode pattern and the second sensing electrode pattern that are directly patterned on one surface of the transparent window in a structure in which the first sensing electrode pattern and the second sensing electrode pattern are insulated from each other.

10. The touch window of claim 9, wherein the metal pattern part is disposed on the transparent window.

11. The touch window of claim 2, wherein the transparent substrate is a film material or a glass material.

12. The touch window of claim 11, wherein the film material is made of any one of polyethylene terephthalate (PET), polycarbonate (PC), polyether sulfone (PES), polyimide (PI), polymethyl methaacrylate (PMMA).

13. The touch window of claim 1, wherein the sensing electrode patterns comprise first and second sensing electrode patterns, and wherein the first and second sensing electrode patterns, the wiring patterns, and the metal pattern part are made of the same material.

14. A liquid crystal display, comprising:
   a backlight unit emitting light;
   a liquid crystal module including a color filter and a thin film transistor receiving light emitted from the backlight unit; and
   the touch window of claim 1.

* * * * *